US009135171B2

(12) United States Patent
Baskakov et al.

(10) Patent No.: US 9,135,171 B2
(45) Date of Patent: Sep. 15, 2015

(54) METHOD FOR IMPROVING SAVE AND RESTORE PERFORMANCE IN VIRTUAL MACHINE SYSTEMS

(75) Inventors: Yury Baskakov, Newton, MA (US); Alexander Thomas Garthwaite, Beverly, MA (US); Jesse Pool, Mountain View, CA (US); Carl A. Waldspurger, Palo Alto, CA (US); Rajesh Venkatasubramanian, San Jose, CA (US); Ishan Banerjee, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 1464 days.

(21) Appl. No.: 12/834,962

(22) Filed: Jul. 13, 2010

(65) Prior Publication Data
US 2012/0017027 A1    Jan. 19, 2012

(51) Int. Cl.
*G06F 12/00* (2006.01)
*G06F 12/08* (2006.01)
*G06F 11/14* (2006.01)
G06F 12/10 (2006.01)
G06F 9/455 (2006.01)

(52) U.S. Cl.
CPC ............ *G06F 12/08* (2013.01); *G06F 11/1448* (2013.01); G06F 12/10 (2013.01); G06F 2009/45583 (2013.01); G06F 2212/401 (2013.01); G06F 2221/0782 (2013.01)

(58) Field of Classification Search
CPC ............ G06F 12/08; G06F 2221/0782; G06F 11/1448; G06F 2009/45583
USPC ...................................... 711/162, 6
See application file for complete search history.

(56) References Cited

U.S. PATENT DOCUMENTS

| 6,502,169 | B1 * | 12/2002 | Noya .............................. 711/138 |
| 7,366,859 | B2 * | 4/2008 | Per et al. ........................ 711/162 |
| 7,853,750 | B2 * | 12/2010 | Stager ............................. 711/112 |
| 2009/0028143 | A1 * | 1/2009 | Eswaran et al. ............... 370/389 |
| 2009/0150646 | A1 * | 6/2009 | Allen et al. .................... 711/213 |
| 2009/0193219 | A1 * | 7/2009 | Ohira et al. .................... 711/170 |
| 2010/0070678 | A1 * | 3/2010 | Zhang et al. ...................... 711/6 |
| 2011/0060915 | A1 * | 3/2011 | Tal ................................. 713/189 |

* cited by examiner

Primary Examiner — Aracelis Ruiz

(57) ABSTRACT

Page data of a virtual machine is represented for efficient save and restore operations. One form of representation applies to each page with an easily identifiable pattern. The page is described, saved, and restored in terms of metadata reflective of the pattern rather than a complete page of data reflecting the pattern. During a save or restore operation, however, the metadata of the page is represented, but not the page data. Another form of representation applies to each page sharing a canonical instance of a complex pattern that is instantiated in memory during execution, and explicitly saved and restored. Each page sharing the canonical page is saved and restored as a metadata reference, without the need to actually save redundant copies of the page data.

23 Claims, 5 Drawing Sheets

METHOD FOR IMPROVING SAVE AND RESTORE PERFORMANCE IN VIRTUAL MACHINE SYSTEMS

BACKGROUND

A virtual machine provides an environment in which an operating system may execute with apparent control of a dedicated physical machine. Multiple virtual machines may execute on a common hardware machine, and each virtual machine may operate with protection and isolation from other virtual machines executing on the same common hardware machine. Each virtual machine typically encapsulates a complete executing state for a corresponding operating system, including both user-level applications and kernel-mode operating system services.

In many computing environments, each hardware machine is typically underutilized on average when executing a corresponding server application. As a result of average hardware underutilization over many hardware machines, computing environments configured to dedicate a hardware machine to each server application are typically characterized as being very inefficient with respect to cost, power consumption, management, and potentially reliability.

Virtual machines are advantageously deployed to consolidate multiple software servers in a computing environment onto one or more shared hardware machines for execution. A hypervisor is a software layer that virtualizes hardware resources, and presents a virtual hardware interface to one or more virtual machine instances that may reflect an underlying hardware machine architecture or an abstraction of an arbitrary machine architecture. The hypervisor may perform certain management functions with respect to an executing virtual machine. For example, the hypervisor may take a snapshot of an encapsulated state for an executing virtual machine, and the hypervisor may use a snapshot to restore execution of a virtual machine. The snapshot may be used for various purposes, such as recovering from a machine fault, or migrating an executing process from one hardware machine to another hardware machine in response to resource availability on each hardware machine.

Each virtual machine executing on a hardware machine includes a memory image of apparent physical memory. Because virtual machines tend to have working sets that are smaller than configured memory for the virtual machine, hardware machine memory may be efficiently overcommitted for many applications. For example, a hardware machine with four gigabytes of total machine memory may host a set of virtual machines that have a total of sixteen gigabytes of apparent configured physical memory. While approximately four gigabytes of machine memory are actually available at any one time, this four gigabytes of machine memory can be used by the set of virtual machines in a multiplexed manner by demand-paging to a file residing in an attached mass storage system. The mass storage system conventionally comprises one or more magnetic hard disk drives; however any form of mass storage system may be used. For example, in modern computer systems the mass storage system may comprise a solid-state drive (SSD) or an array of SSDs. Page sharing and ballooning, among various techniques, may be employed to reduce demand paging and enhance overall efficiency. Each saved or retrieved snapshot is also conventionally stored to the mass storage system. As such, when the hypervisor executes a save operation or a restore operation, an entire memory image for the corresponding virtual machine is conventionally stored to or retrieved from a relatively slow storage media, diminishing overall system performance.

SUMMARY

One or more embodiments provide methods for representing page data of a virtual machine for efficient save and restore operations. One form of representation applies to each page with an easily identifiable pattern. The page is described, saved, and restored in terms of metadata reflective of the pattern rather than a complete page of data reflecting the pattern. Another form of representation applies to each page sharing a canonical instance of a complex pattern that is instantiated in memory during execution, and explicitly saved and restored. Each page sharing the canonical page is saved and restored as a metadata reference, without the need to actually save redundant copies of the page data.

A method of saving non-zero memory pages of a virtual machine in an efficient manner, according to an embodiment of the invention, includes determining that a non-zero memory page has a known pattern, storing metadata of the non-zero memory page in persistent memory and not contents of the non-zero memory page, and storing contents of a group of other non-zero memory pages in the persistent memory.

A method of restoring to system memory non-zero pages of a virtual machine that have been saved to persistent memory, according to an embodiment of the invention, includes retrieving metadata of a non-zero page from the persistent memory and examining the metadata, determining that the metadata describes a non-zero page having a known pattern, generating a non-zero page having the known pattern and storing contents of the non-zero page having the known pattern in the system memory, and mapping the non-zero page described by the metadata retrieved from the persistent memory to a location in the system memory where the contents of the non-zero page having the known pattern are stored.

A method of migrating non-zero memory pages of a virtual machine executed in a first computer for execution in a second computer, according to an embodiment of the invention, includes examining metadata of a non-zero memory page of the virtual machine, determining that the examined metadata describes a non-zero memory page having a known pattern, generating a non-zero memory page having the known pattern and storing contents of the non-zero memory page having the known pattern in a system memory of the second computer, and mapping the non-zero memory page described by the examined metadata to a location in the system memory of the second computer where the contents of the non-zero memory page having the known pattern are stored.

A virtual machine computer system, according to an embodiment of the invention includes a system memory, and one or more processors programmed to execute a virtual machine process, and to save and restore some of non-zero memory pages of the virtual machine process using metadata that contains sufficient data for contents of the some of the non-zero memory pages to be regenerated from the metadata.

DETAILED DESCRIPTION

Figure 1:
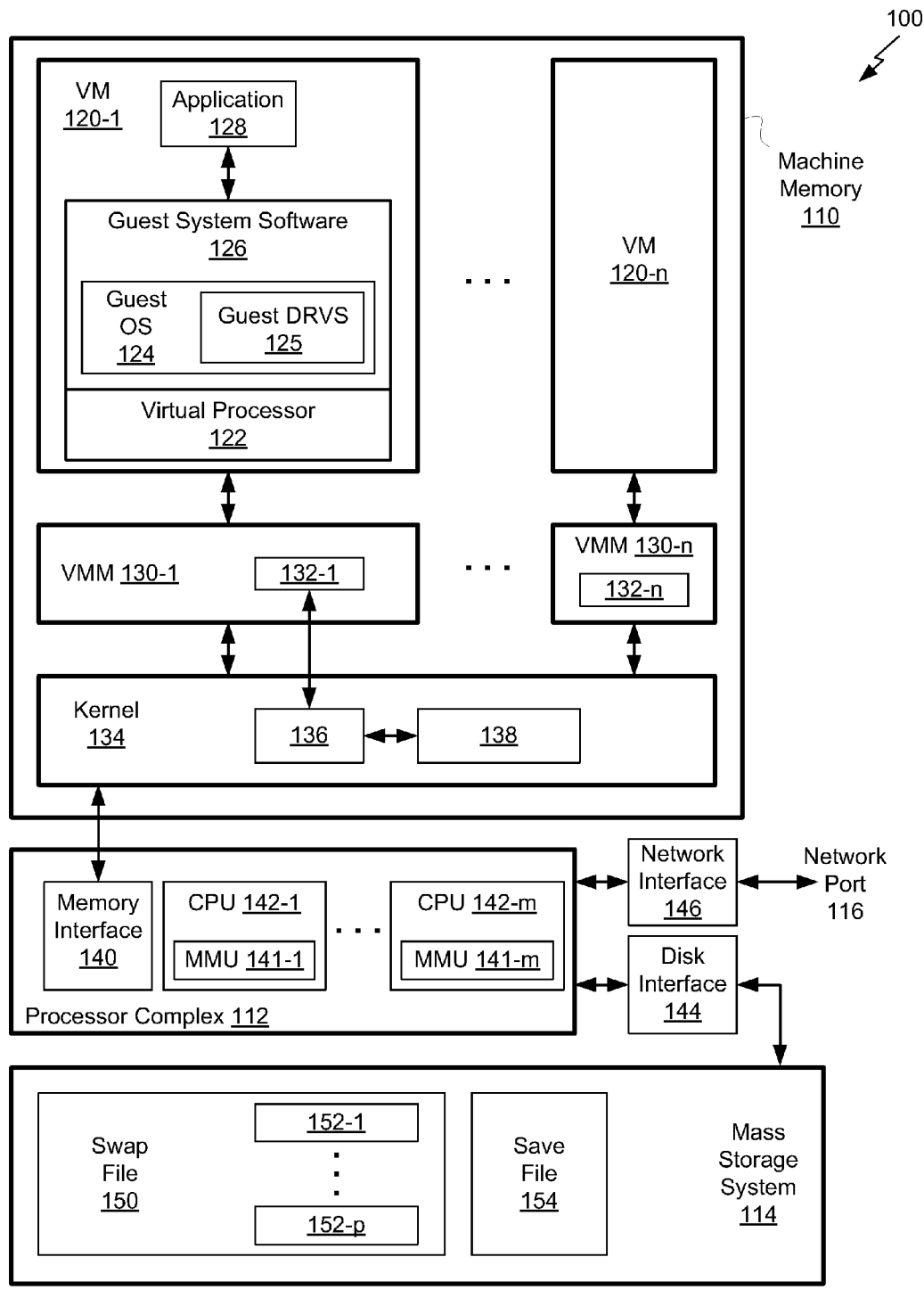
FIG. 1 is a block diagram illustrating a computer system configured to implement one or more aspects of the present invention.

FIG. 1 is a block diagram illustrating a computer system 100 configured to implement one or more aspects of the present invention. The computer system 100 includes a processor complex 112, machine memory 110, and a mass storage system 114. The processor complex 112 may be coupled to the machine memory 110 via any technically feasible electrical interface, such as a dynamic random access memory (DRAM) interface. In other configurations, the processor complex 112 may be coupled to machine memory 110 via a general transport (bridging) interface, such as industry standard HyperTransport™, PCI-Express™, or any other technically feasible transport interface. The processor complex 112 may be coupled to mass storage system 114 via a native storage interface, such as serial advanced technology attachment (SATA), serial attached small computer system interface (SAS), or any other technically feasible native storage interface. In other configurations, the processor complex 112 is coupled to mass storage system 114 via a network enabled storage interface such as Fibre Channel, internet small computer system interface (iSCSI), or any other technically feasible network enabled storage interface.

The processor complex 112 includes, without limitation, a memory interface 140 and one or more central processing units (CPU) 142-1 through 142-m. The memory interface 140 is configured to couple machine memory 110 to the one or more CPUs 142. Each of the one or more CPUs 142 is configured to execute program instructions stored within machine memory 110. The program instructions are organized as software modules that may be stored for execution within machine memory 110. Each of the one or more CPUs 142 includes a memory management unit (MMU) 141 configured to perform, without limitation, translation of addresses, such as virtual addresses, to machine addresses. A disk interface 144 and a network interface 146 are coupled to the processor complex 112. The disk interface 144 is configured to couple the mass storage system 114 to the one or more CPUs 142. The disk interface 144 may include implementation specific functionality related to controlling disk systems. Such functionality may include, for example, control for redundant array of independent disks (RAID) and caching. The mass storage system 114 may comprise any technically feasible storage elements, such as magnetic disk drives, solid state drives, or any other elements configured to read and write data for persistent storage. The network interface 146 is configured to couple network port 116 to the one or more CPUs 142. The network interface 146 is configured to couple network port 116 to the one or more CPUs 142 within processor complex 112. The network interface may include any functionality required to transmit and receive data packets via the network port 116. In one configuration, the network port 116 is an industry standard Ethernet port.

In one embodiment, an executing memory image within machine memory 110 includes a kernel 134, at least one VMM 130, and at least one virtual machine (VM) 120. Each of the at least one VM 120 is associated on a one-to-one basis with one of the at least one VMM 130.

As shown, VM 120-1 includes a virtual processor 122, guest systems software 126, and an application 128. The application 128 may launch and execute according to a conventional run time model for a conventional user-space or kernel-space application for the guest system software 126. In one embodiment, the guest system software 126 includes a guest operating system (OS) 124, such as a commodity operating system. The guest OS 124 is conventionally configured to provide process control, memory management, and other services required by the application 128. The guest OS 124 includes guest drivers (DRVS) 125 configured to manage corresponding virtual devices (not shown) accessible to the virtual processor 122. The virtual devices are implemented in software to emulate corresponding system hardware components of an actual hardware processor system. The virtual devices may include, without limitation, a network interface, a mass storage interface, peripheral devices, and system memory. During normal execution, the application 128 generates load and store requests targeting a virtual address space, organized as guest virtual page numbers (GVPNs). A request to a GVPN within the guest virtual address space may be mapped to a corresponding guest physical address and guest physical page number (GPPN) by the emulated MMU function within the virtual processor 122. Guest physical memory is organized as distinct units, called pages, each with a corresponding, unique GPPN.

Each of the at least one VM 120 may have a substantially identical internal structure to VM 120-1. Each of the at least one VM 120 may also have an independent physical address space, and therefore a given GPPN within one VM 120 is independent of the same GPPN within a different one of the at least one VM 120.

Each GPPN references a page of guest physical memory, stored in either machine memory 110 or the mass storage system 114. Therefore, a GPPN may map to a machine page number (MPN) residing within machine memory 110, or a GPPN may map to a page stored on the mass storage system 114. More than one GPPN may map to a common MPN when the more than one GPPN is in a shared configuration.

In general, a VMM provides an interface between a VM and a host runtime environment. The host runtime environment may be a conventional operating system or a kernel configured to manage hardware elements and overall operation of the computer system 100 and thereby provide system services to the VMM. Alternatively, the host runtime environment may be any technically feasible software module configured to manage the computer system 100 and thereby provide system services to the VMM. The VMM provides access to hardware devices and system services to enable the VM to emulate an apparent hardware system via the virtual processor 122.

In one embodiment, the VMM 130-1 is configured to provide a software interface between VM 120-1 and the kernel 134. In other embodiments, the VMM 130-1 may be configured to provide an interface between VM 120-1 and a host operating system (not shown). The VMM 130-1 includes a GPPN to MPN map 132-1, used to translate guest physical addresses generated by VM 120-1 into corresponding machine addresses that may be used to access data stored in machine memory 110. Each VMM 130-1 through 130-n includes a respective GPPN to MPN map 132. In one embodiment, GPPN to MPN maps 132-1 through 132-n are managed by the kernel 134.

The kernel 134 is configured to manage certain hardware and software resources within the processor complex 112. In particular, the kernel 134 schedules and manages processes VM 120-1 through 120-n, and VMM 130-1 through VMM 130-n, executing on the one or more CPUs 142. The kernel 134 includes at least one memory management table 136, configured to maintain each GPPN to MPN mapping for accessing machine memory 110. The memory management table 136 includes mappings for each GPPN to MPN map 132-1 through 132-n. In this way, the kernel has a global view of all guest physical address to machine address mappings.

The total storage configured for all guest physical address spaces for VMM 130-1 through VMM 130-n may exceed the total available storage within machine memory 110. The kernel 134 implements a memory paging system that swaps selected pages of memory between machine memory 110 and the swap file 150 within the mass storage system 114. Any technically feasible technique may be used to page data between machine memory 110 and the swap file 150, residing within a persistent storage system. In an alternative embodiment, a distinct swap file may be associated with each VM 120. Persons skilled in the art will recognize that these and other file organizations may be implemented without departing the scope of the invention. Furthermore, any technically feasible technique may be implemented to select a page to be swapped from machine memory 110 to a swap file and vice versa. When a page of memory is swapped from machine memory 110 to the swap file 150, the memory management table 136 is updated to reflect a change in disposition of the corresponding GPPN as being in the swap file 150 rather than resident in machine memory 110. Similarly, when a page 152 within the swap file 150 is swapped into machine memory 110, the memory management table 136 may be updated to reflect another change in disposition for the corresponding GPPN as being resident in machine memory 110 rather then in the swap file 150. While only a portion of all valid GPPNs may exist in machine memory 110 (mapped to MPNs) at any one time, a slot is reserved within the swap file 150 for each allocated GPPN that is not stored in machine memory 110. Furthermore, an entry may be allocated within the memory management table 136 for each page 152 within the swap file 150. In certain embodiments, the VMM 130 intercepts MMU instructions from the guest OS 124 to enable the kernel 134 to configure MMUs 141 to perform direct GVPN to MPN mappings for high performance memory access from each corresponding VM 120. Certain MMU implementations allow nested mappings, enabling the MMU to perform direct GVPN to MPN mappings for high performance access from each corresponding VM 120.

A memory image for a typical guest OS 124 operating in concert with a typical application 128 will commonly include a large number of pages of memory written with identical data. One form of identical data is characterized by a repeating pattern of one through four bytes. For example, pages of memory written completely with zeros occur commonly. Such pages may be completely described by a simple characteristic pattern and a construction rule or "class description." Another form of identical data is characterized by complex patterns that have no discernible structure other than being instantiated multiple times as whole pages. Such pages may be described via a reference to a canonical instance of the page; in this case, the class description is that of an "unknown class" rather than a specific construction class. As a way to classify and track these types of pages and to map pages written with identical data to a single MPN, one or more embodiments employs a module 138. The module 138 is implemented to include multiple functions including page classification functions used to identify characteristics of page contents, and contents tracking functions used to manage the allocation and mapping of MPNs and mapping of GPPNs to MPNs.

In one embodiment, the module 138 generates a page signature that is used to efficiently classify contents for each MPN. Certain forms of page signatures completely represent page contents comprising a simple pattern. The pattern form is represented as a pattern class description and pattern data represented as a page identification tag. Other forms of page signatures, generated by hashing page contents, efficiently indicate potentially equivalent pages. The module 138 is configured to determine whether a given GPPN may share a common MPN with other GPPNs, to initiate sharing, and to facilitate sharing termination when one GPPN needs a private MPN, for example using a "copy on write" technique. In one embodiment, a new MPN is allocated to store shared page data for two or more GPPNs. The module 138 further includes a hash table, or any other technically feasible data structure, configured to store page signature data that may be used to determine if a given page is identical to an existing page, and if sharing may proceed. Operation of the module 138, which includes initiating sharing and terminating sharing, is described in greater detail below in FIGS. 2 through 7.

Each shared MPN is marked with a "copy on write" (COW) attribute. "Copy on write" describes a well known technique in the art in which a new instance of a shared MPN is created and mapped directly to the GPPN being written. When a write operation to a GPPN marked with a COW attribute is performed, a new MPN is allocated and the contents of the original (canonical) MPN are copied to the new MPN. The referencing GPPN is then mapped to the new MPN and the associated COW attribute is cleared for the new MPN. Contents of U.S. Pat. Nos. 6,789,156 and 7,620,766 relating to read-only mappings, COW, content-based deduplication, and accelerated comparisons by hashing, are hereby incorporated by reference.

In one embodiment, when a snapshot is taken, b all mapped memory pages associated with VM 120-1 are marked with a COW attribute to ensure the snapshot is consistent, after which, page contents may be saved asynchronously. Original pages for each subsequent page copied as a result of a copy on write (store) operation may be released after being captured in the snapshot. In an alternative embodiment, when VMM 130-1 executes a suspend operation, VM 120-1 is halted and a save file 154 is generated to capture a precise executing state of the VM 120-1. When VMM 130-1 executes a restore operation, save file 154 is read into the state of VM 120-1 and execution commences. In some embodiments of the invention, the module 138 is invoked during save and restore operations of a VM, but is not used when the VM is executing.

To improve performance and reduce overall storage associated with generating the save file 154, each GPPN that may be characterized completely by a repeating pattern (or, for example, any other regular expression) is compressed to a description of the pattern rather than an actual page of data containing the pattern. Furthermore, each GPPN may be represented as a reference to a canonical reference page stored to save file 154. In this way, certain pages may be compressed and stored in metadata for the pages rather than stored as corresponding data within the pages. In one embodiment, the save file 154 is organized to include metadata for each GPPN, and page data to which each GPPN may map. One or more GPPNs within the save file 154 may map to a given page of page data within the save file 154. Page data may be organized within the save file 154 according to sharing status. For example, shared pages of page data may be stored together in one region of the save file 154. In one embodiment, shared pages of data from the one region are restored prior to restoring other pages of data stored within the save file 154. Persons skilled in the art will recognize that restoring certain categories of pages, such as shared, hot, and cold pages, in sequence may provide certain performance advantages. Page data matching no known pattern class may be stored in a compressed format within the save file 154 using any technically feasible lossless compression technique. GPPNs may also be stored within the save file in an unshared configuration, but with metadata configured to indicate which pages are identical for potential page sharing. On restoration, the metadata is used to facilitate sharing for a restored image. Metadata for each GPPN within the save file 154 may also indicate pattern information for corresponding GPPNs that are characterized as having a known pattern, such as a repeating pattern of zero or "DEADBEEF." Upon executing a restore operation, the metadata may uniquely indicate how a page is to be reconstructed for use. Certain metadata may be represented as a bitmap, for example, to indicate which GPPNs are identical. In one bitmap representation, each GPPN stored in the save file has a corresponding bit within the bitmap. A GPPN is represented as being in a particular page set, such as a zero page set, when a corresponding bit is set within the bitmap. One or more page sets may be represented by corresponding bitmaps stored within the save file 154. Persons skilled in the art will recognize that other data structures may be also used to represent metadata for pages and page sets without departing the scope of the present invention.

When the VMM 130-1 executes a restore operation, page data stored in the save file 154 is read and allocated to GPPNs for use by VMM 130-1. Some of the allocated GPPNs may be located in machine memory 110, while others may be allocated into pages 152 of the swap file 150. In one embodiment, a first instance of a new canonical page causes a corresponding page to be allocated and reconstructed according to a class and pattern description stored in metadata for the page. The reconstructed page is stored as a canonical page for that pattern within the swap file 150. The reconstructed page may also be instantiated as a page within machine memory 110. Subsequent pages stored in the save file 154 matching the canonical page may simply reference the canonical page, with a COW attribute set. Each identical page may have a separate GPPN entry, but the GPPN entries are mapped to the MPN of the matching canonical page. In an alternative embodiment, a restore operation maps each GPPN to a corresponding private MPN, without allowing a GPPN to share an MPN. Persons skilled in the art will recognize that a restore operation may implement various modes, including one mode with page sharing enabled and a different mode with page sharing disabled.

When a VM 120 is migrated from computer system 100 to a different target computer system (not shown) for execution on the target computer system, a data set corresponding to save file 154 is generated and transported, for example via network port 116, to the target computer system. Saving and restoring are generally performed as described above with respect to the save file 154. However, data otherwise bound for the save file 154 is transported to the target computer system for execution. In one embodiment, a save file 154 is created on the source computer system 100 and transmitted to the target computer system for storage in nonvolatile memory and execution from system memory. In an alternative embodiment, save data from the source computer system 100 is transmitted directly to the target computer system for storage in nonvolatile memory and execution from system memory without being stored in the source computer system 100. In yet another alternative embodiment, save data from the source computer system 100 is transmitted directly to the target computer system and loaded directly into system memory for execution.

Figure 2:
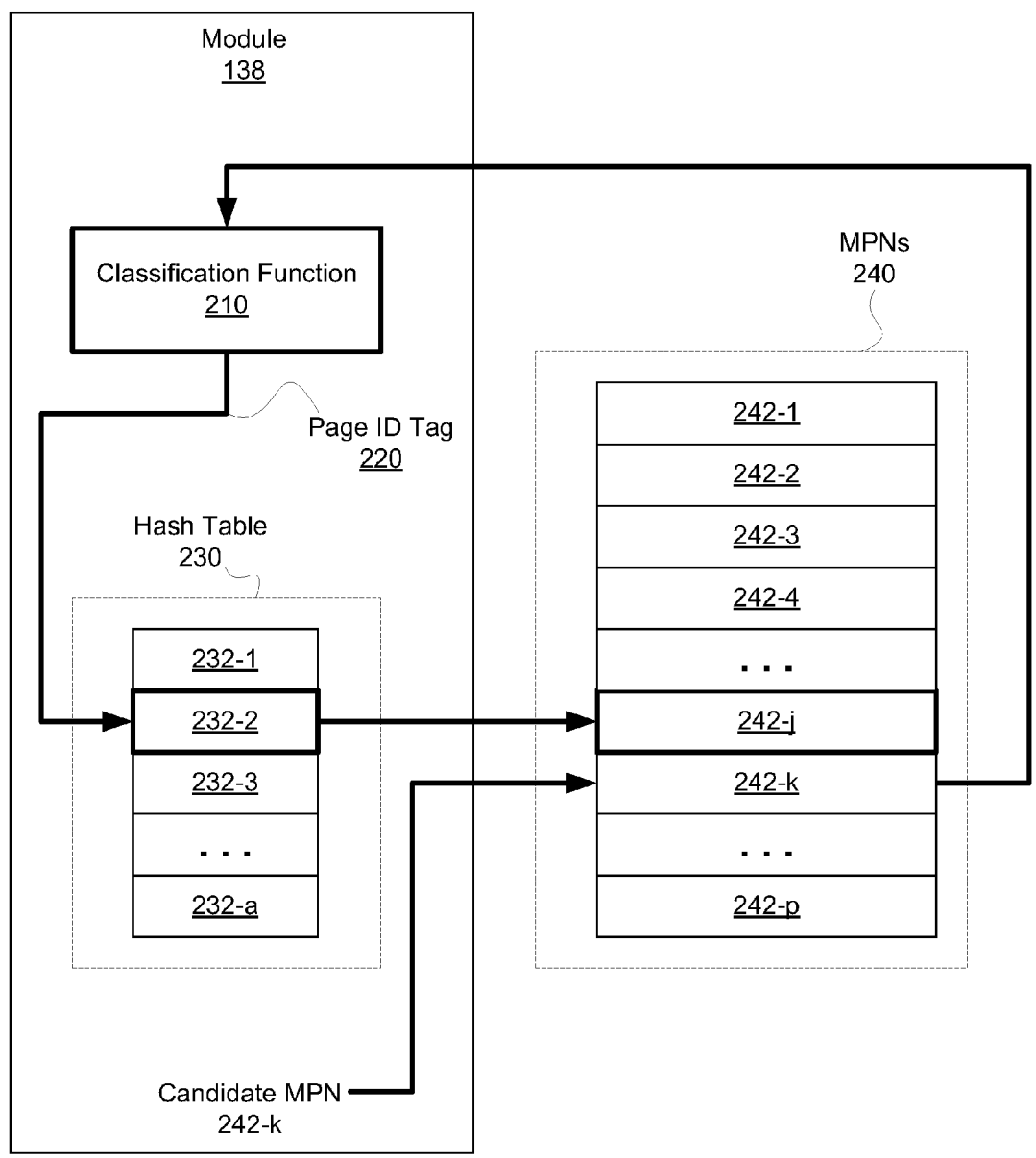
FIG. 2 illustrates generating a page sharing association between machine page numbers based on page content, according to one embodiment of the invention.

FIG. 2 illustrates generating a page sharing association between machine page numbers based on page content, according to one embodiment of the invention. In this example, MPN 242-k is selected as a candidate for potential sharing with another MPN 242 within a set of MPNs 240. A page classification function 210 generates a page ID tag 220 from the contents of MPN 242-k. The page classification function 210 may include one or more of a hash function and a pattern search function. In embodiments of the invention where the pattern search function is not included in the page classification function 210, duplicate pages, whether or not they contain known patterns, are identified using the hash function and comparing the resulting value against entries in the hash table 230, as further described below. In addition, the metadata for these duplicate pages references a canonical page.

In one embodiment, page ID tag 220 includes a class and an operand. The class indicates how the operand is interpreted. For example, the class may indicate that the operand is a hash value generated from data content of candidate MPN 242-k. A corresponding page of data may not be reconstructed solely from such a page ID tag 220. However, additional instances of identical data may be reconstructed, such as during a copy on write operation, by reference to a canonical page for the data. If the class indicates a repeating or known class of pattern, then the operand may represent a repeated value within the pattern. A corresponding page of data may be reconstructed solely from such a page ID tag 220. Furthermore, a corresponding page of data may be compressed and represented solely as the page ID tag 220. In one embodiment, the operand is a sixty-four-bit value.

Any technically feasible data structure may be employed to implement hash table 230. In one embodiment, a hash table includes an array of entries corresponding to a range of hashed indices. An index from the range of hashed indices may be extracted from a page ID tag. Each entry from the array of entries may include a reference to no frame, one frame, or a plurality of frames corresponding respectively to no matches, one match, or a plurality of matches for the entry. Each frame may include, without limitation, a complete page ID tag associated with the frame, one or more attributes, and a reference to an MPN. In certain embodiments, more than one hash table may be used, for example to separately track pages with "known" pattern classes and pages with an "unknown" pattern class.

The page ID tag 220 is used to attempt a match with an entry 232 from hash table 230. If no entry 232 matches the page ID tag 220, then a new entry 232 may be added to the hash table 230. The new entry 232 is populated with the page ID tag 220 and a reference to the MPN 242 that produced the page ID tag 220. If the page ID tag 220 matches an entry 232 in the hash table 230 and the page ID tag 220 indicates a class that may not be reconstructed solely from the page ID tag 220, then a detailed comparison of the two corresponding pages is performed. If the detailed comparison indicates the two pages do not contain identical data, then the page ID tag 220 and related MPN data may be added to a linked list of unique hash entries matching the page ID tag 220. If the detailed comparison indicates the two pages contain identical content, then the two pages may share a common MPN, and the module 138 state is updated to reflect that the two pages are currently shared. Furthermore, memory management table 136 is updated to reflect the shared mapping.

Alternatively, if the page ID tag 220 matches an entry 232 in the hash table 230 and the page ID tag 220 indicates a class that may be reconstructed solely from the page ID tag 220, then the two pages may share a common MPN, and the module 138 state is updated to reflect that the two pages are currently shared. Furthermore, memory management table 136 is updated to reflect the shared mapping. No detailed comparison is necessary between two pages with a matching page ID tag 220 because the page ID tag 220 uniquely represents the contents of the two pages.

In this example, the page ID tag 220 matches entry 232-2, which refers to MPN 242-j, the canonical page for matching page ID tags. Because page ID tag 220 matches entry 232-2, and because entry 232-2 refers to MPN 242-j as the canonical page for the page ID tag, MPN 242-k may share MPN 242-j and read requests to MPN 242-k may be directed to MPN 242-j. Furthermore, a save operation to store MPN 242-k needs only store either page ID tag 220 or a reference to MPN 242-j rather than an entire page of data. A restore operation for MPN 242-k may be performed after retrieving either page ID tag 220 from associated metadata, or a reference to MPN 242-j from associated metadata, rather than an entire page of data for MPN 242-k. Effectively, the page ID tag 220 forms a basis for compression of certain pages of data, such as MPN 242-k.

In certain situations, a canonical page may be a dictionary page and not be associated with any particular VM. Dictionary pages may include, for example, pages of a particular guest operating system or applications that have comment content. In one embodiment, none of the dictionary pages have a known pattern. In other embodiments, one or more of the dictionary pages have a known pattern.

Additionally, in the embodiments of the invention described above, a hash function and a hash table are used to manage page sharing and mapping. In alternative embodiments of the invention, any map may be used, e.g., trie based map, simple lookup table, etc. Furthermore, when it is determined from the page classification function 210 that a page belongs to a known pattern class, the page is immediately mapped to a canonical page for that known pattern class.

Figure 3:
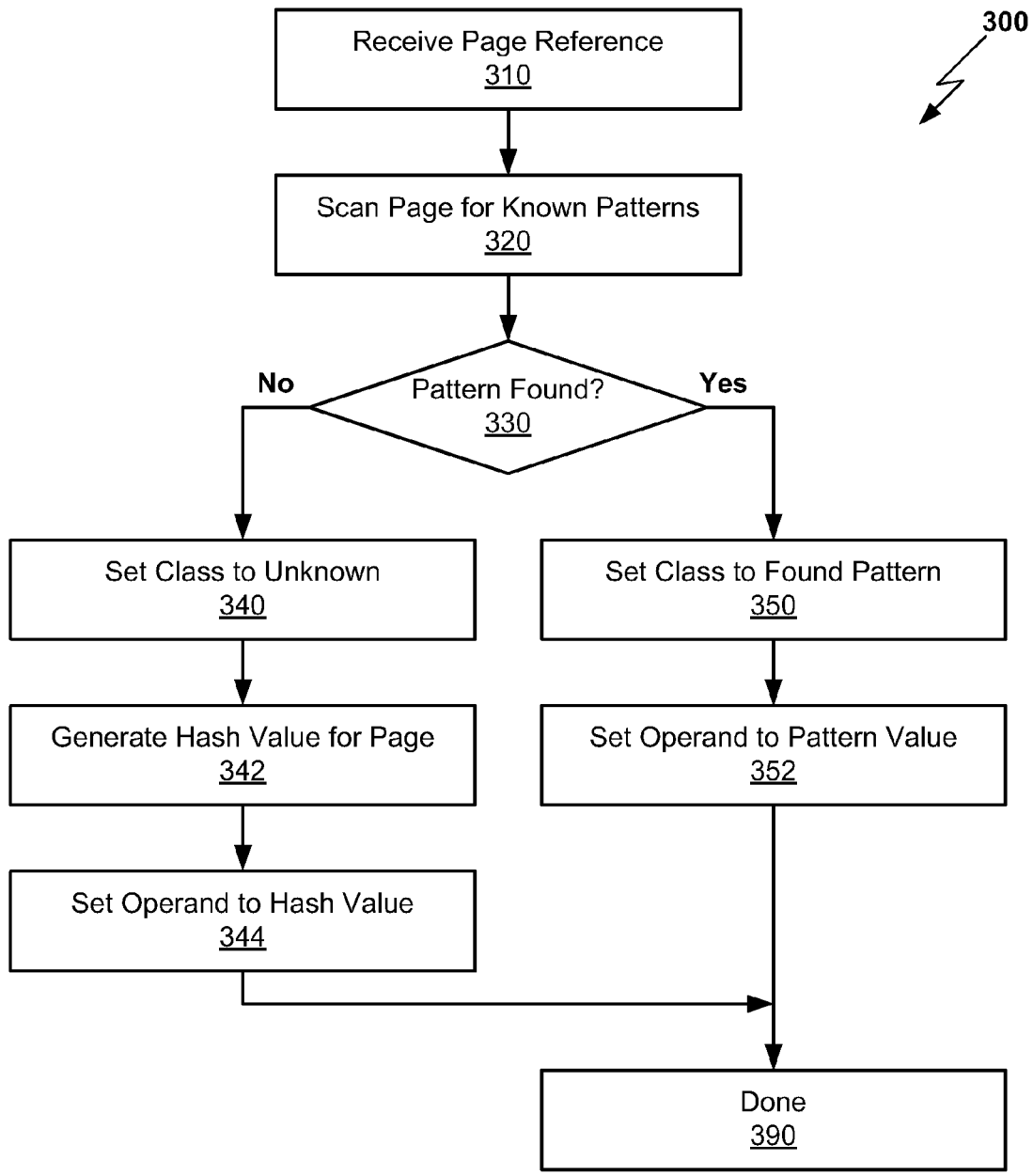
FIG. 3 is a flow diagram of method steps, performed by a module for generating a page ID tag for a page of memory based on contents of the page of memory, according to one embodiment of the invention.

FIG. 3 is a flow diagram of method steps 300, performed by a module 138, for generating a page ID tag for a page of memory based on contents of the page of memory, according to one embodiment of the invention. Although the method steps are described in conjunction with the system of FIGS. 1 and 2, persons skilled in the art will understand that any system configured to perform the method steps is within the scope of the invention.

The method begins in step 310, where the module 138 receives a page reference to an MPN. In step 320, the module 138 scans the contents of the page for known patterns. In a typical page that does not contain a pattern, scanning may terminate very early on because only a few bytes or words of a page will often reveal a lack of any known pattern. Any technically feasible scanning technique may be used, including regular expression searching techniques.

In step 330, if a pattern is found, then the method proceeds to step 350, where the module 138 sets a class field within the page ID tag to an appropriate class for the found pattern. Examples include a repeating byte or word pattern, such as a repeating pattern of "00000000," "CCCCCCCC," "DEADBEEF," and the like. Persons skilled in the art will recognize that an initialized or sparsely populated data structure may predominately include pages filled with zeros, while a region of un-initialized memory that has been tested at boot time may be filled will all C's or all 5's, and so forth. In step 352 the module 138 sets an operand field within the page ID tag to a pattern value (e.g., "00000000," "DEADBEEF," etc.) found while performing the scan of step 320. Alternatively, the module 138 sets an operand field within the page ID tag to a canonical page that contains the repeating pattern. The method terminates in step 390.

Returning to step 330, if a pattern is not found, then the method proceeds to step 340, where the module 138 sets the class field within the page ID tag to reflect an unknown pattern. In step 342, the module 138 generates a hash value for the page. Any technically feasible hashing function may be used, such as the well known, public-domain "Bob Jenkins" hashing function for generating sixty-four bit hash values. In step 344, the module 138 sets the operand field within the page ID tag to the resulting hash value computed in step 342.

Figure 4:
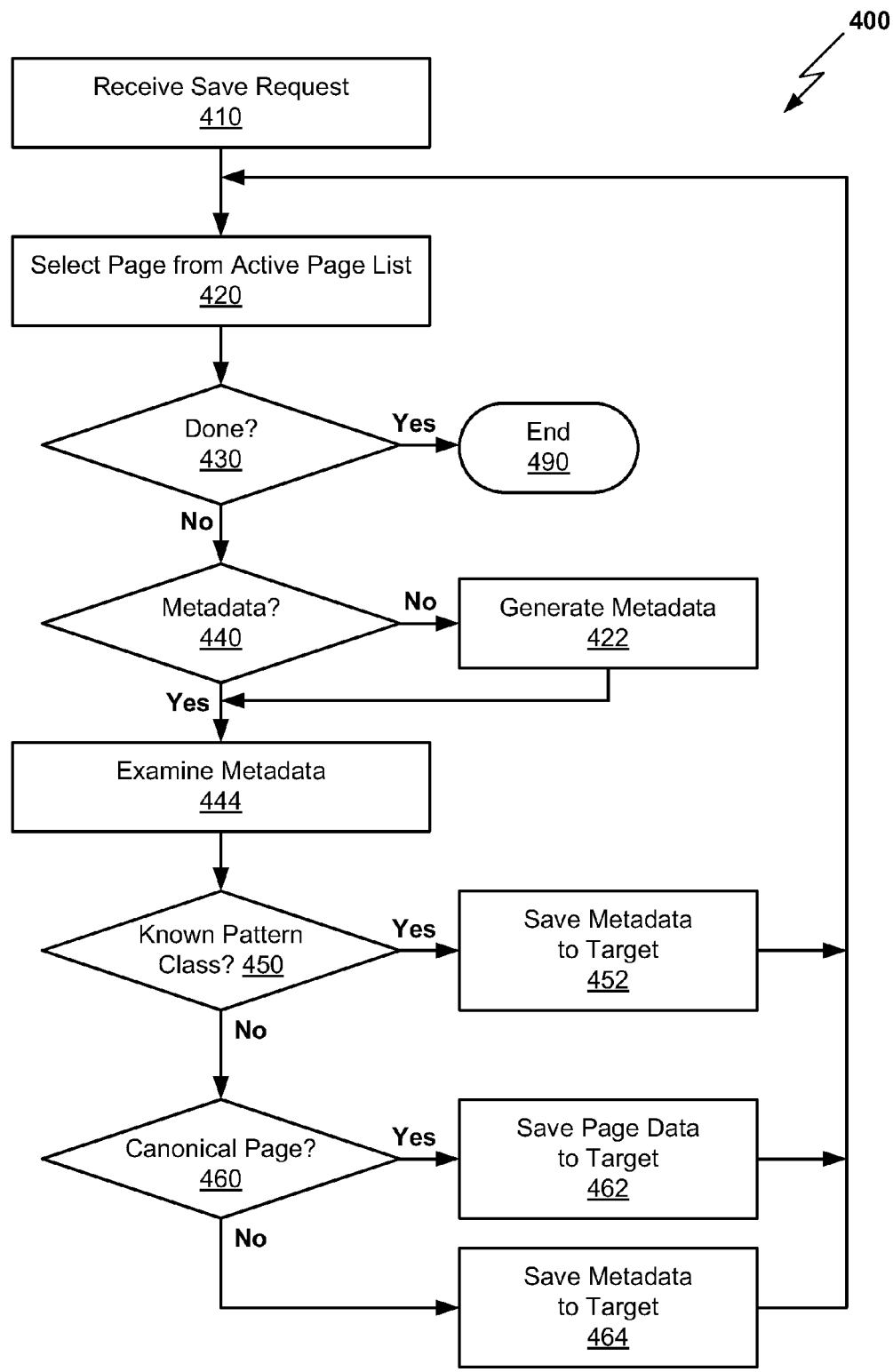
FIG. 4 is a flow diagram of method steps, performed by a save module within virtual machine monitor (VMM), host kernel, or host operating system, for saving active pages of memory for a virtual machine, according to one embodiment of the invention.

FIG. 4 is a flow diagram of method steps 400, performed by a save module within VMM 132, host kernel 134, or host operating system, for saving active pages of memory for a virtual machine, according to one embodiment of the invention. Although the method steps are described in conjunction with the system of FIGS. 1 and 2, persons skilled in the art will understand that any system configured to perform the method steps is within the scope of the invention.

The method begins in step 410 where the save module receives a save request for MPNs used by a specific virtual machine 120 and identified by an active page list. The save request identifies the active page list and a target identifier. The target identifier may be a save file, such as save file 154, or another computer system preparing to execute a transferred virtual machine context.

In step 420, the save module selects a page from the active page list. In one example, the selected page to be processed initially may be the first page in the active page list. Sequential pages in the active page list may be selected and processed in sequence. Alternatively, the active page list may be processed in a non-sequential order. If in step 430, there are remaining pages to be processed in the active page list, then the method proceeds to step 440. If, in step 440, the selected page does not currently include metadata for the page, then the method proceeds to step 422, where the module 138 of FIG. 1 generates metadata for the selected page, as described above in FIG. 3. Otherwise, if the selected page does include metadata, then the method proceeds to step 444.

In step 444, the metadata of the selected page is examined. If, in step 450, it is determined from the metadata that the selected page includes a known pattern, then the method proceeds to step 452, where the metadata for the selected page is saved to the identified target. The metadata for the selected page may include a pattern value or a reference to a canonical page. The method then proceeds back to step 420.

Returning to step 450, if it is determined from the metadata that the selected page does not include a known pattern, then the method proceeds to step 460. If, in step 460, the selected page is a canonical page for the data pattern contained in the selected page, then the method proceeds to step 462, where the page data for the selected page is saved to the identified target. The selected page may be saved with a marking to indicate that the selected page is a canonical page for the associated data pattern. Each page that is a first instance of a page with a particular data pattern is a canonical page for the particular data pattern. For any page that is a second instance of the particular data pattern, the metadata for that page containing a reference to the canonical page for the particular data pattern is stored. The method then proceeds back to step 420. Therefore, if a selected page is not a canonical page for the data pattern contained in the selected page, then the method proceeds to step 464, where the metadata for the selected page is written to the identified target. After steps 462 and 464, the method then proceeds to step 420.

Returning to step 430, if there are no more remaining pages to be processed in the active page list, then the method terminates in step 490.

Figure 5:
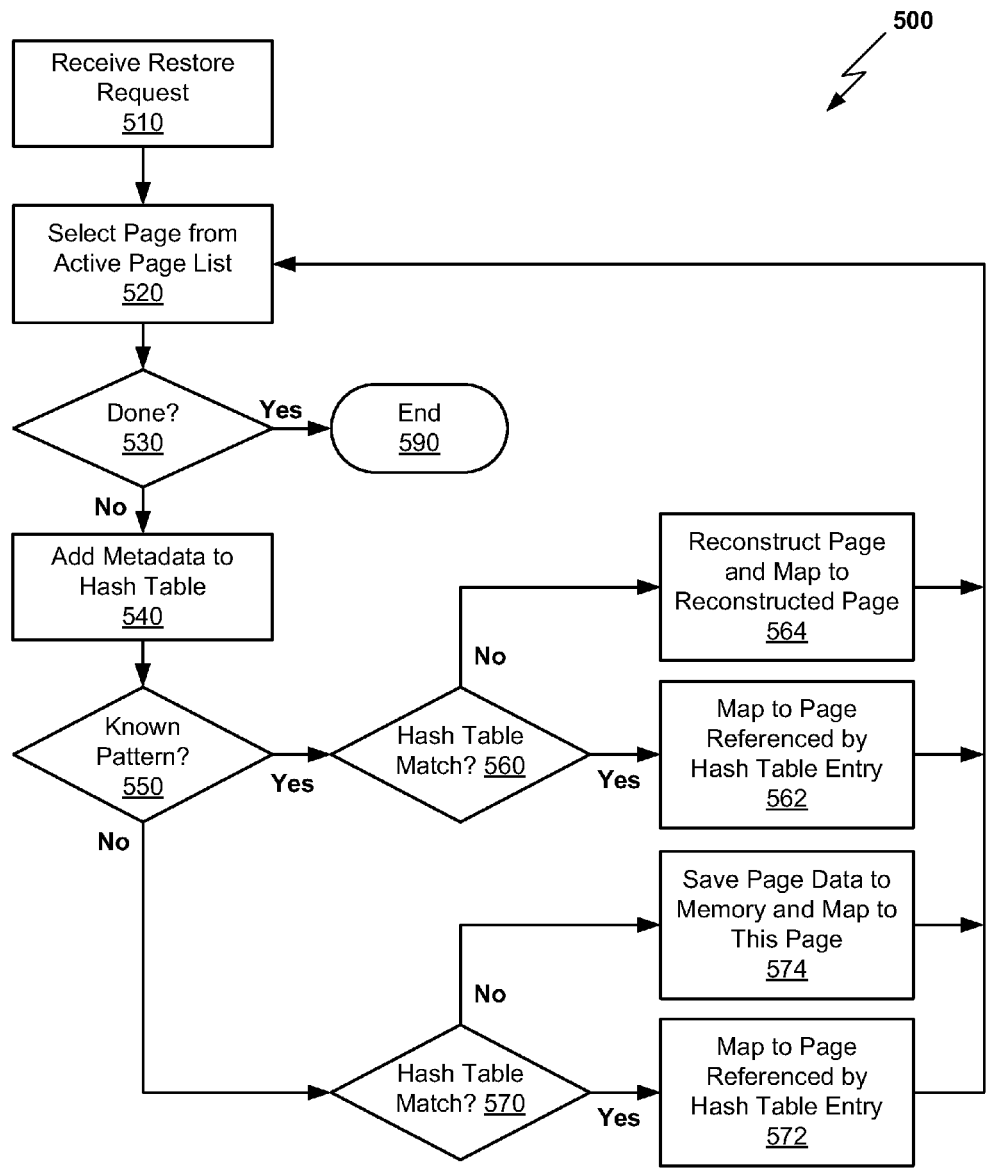
FIG. 5 is a flow diagram of method steps, performed by a restore module within virtual machine monitor, host kernel, or host operating system, for restoring active pages of memory for a virtual machine, according to one embodiment of the invention.

FIG. 5 is a flow diagram of method steps 500, performed by a restore module within virtual machine monitor 132, host kernel 134, or host operating system, for restoring active pages of memory for a virtual machine, according to one embodiment of the invention. Although the method steps are described in conjunction with the system of FIGS. 1 and 2, persons skilled in the art will understand that any system configured to perform the method steps is within the scope of the invention.

The method begins in step 510 where the restore module receives a restore request for a virtual machine. The restore request identifies a source for the active page list (such as a save file or different computer system) and a target identifier for the virtual machine being prepared for execution. A target in this scenario refers to the virtual machine, and related context data structures, being prepared for execution.

In step 520, the restore module selects a page from the active page list. In one example, the selected page to be processed initially may be the first page in the active page list. Sequential pages in the active page list may be selected and processed in sequence. Alternatively, the active page list may be processed in a non-sequential order. If in step 530, there are remaining pages to be processed in the active page list, then the method proceeds to step 540.

In step 540, the metadata of the selected page is added to the hash table 230. If, in step 550, it is determined from the metadata that the selected page includes a known pattern, then the method proceeds to step 560. In step 560, it is determined whether or not there is an entry in the hash table 230 with the same pattern class. If there is a hash table entry with the same pattern class, a sharing opportunity is determined to exist and the restore module maps the selected page to the memory page referenced by the hash table entry (step 562). On the other hand, if there is no hash table entry with the same pattern class, the restore module reconstructs the page for the known pattern class, saves the reconstructed page to memory, and maps the selected page to this reconstructed page (step 564).

Returning to step 550, if it is determined from the metadata that the selected page does not include a known pattern, then the method proceeds to step 570. In step 570, it is determined whether or not there is an entry in the hash table 230 that references a memory page with identical content. The process for determining whether there is a memory page with identical content is the same as the one described above in conjunction with FIG. 2. If there is a memory page with identical content, a sharing opportunity is determined to exist and the restore module maps the selected page to this memory page (step 572). On the other hand, if there is no memory page with identical content, the restore module copies the contents of the selected page to a page in memory, and maps the selected page to this page (step 574).

After steps 562, 564, 572, and 574, the method returns to step 520, where the restore module selects another page from the active page list. If, in step 530, it is determined that there are no more remaining pages to be processed in the active page list, then the method terminates in step 590. Persons skilled in the art will recognize that method steps 500 may be modified to disable page sharing for a restored image without departing the scope of the invention. Specifically, the method may proceed from step 550 directly to step 564 when the metadata is determined to be of a known pattern class, and from step 550 directly to step 574 otherwise.

In sum, a technique for compressing page data of a virtual machine is disclosed. One form of compression may be applied to each page with an easily identifiable pattern. A given page may be described, saved, and restored in terms of metadata reflective of the pattern rather than a complete page of data reflecting the pattern. During execution of an associated virtual machine, one instance of the page is represented in memory and shared with other identical pages. During a save or restore operation, however, only the metadata needs to be represented. Another form of compression may be applied to each page sharing a canonical instance of a complex pattern that is instantiated in memory during execution, and explicitly saved and restored. Each page sharing the canonical page is saved and restored as a metadata reference only, without the need to actually save redundant copies of the page data.

One advantage of the present invention is that higher performance and lower storage requirements may be achieved when saving, restoring, and migrating execution of virtual machines compared to prior art techniques.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of saving non-zero memory pages of a virtual machine, the method comprising:
   determining that a non-zero memory page has a known pattern;
   storing metadata of the non-zero memory page in persistent storage and not contents of the non-zero memory page, the metadata including sufficient data for the contents of the non-zero memory page to be regenerated solely from the metadata; and
   storing contents of a group of other non-zero memory pages in the persistent storage.

2. The method of claim 1, further comprising:
   determining that two of the other non-zero memory pages have identical content; and
   storing, in the persistent storage, a canonical page having the identical content and metadata for each of the two non-zero memory pages having identical content that references the canonical page.

3. The method of claim 2, wherein determining that a first non-zero memory page and a second non-zero memory page have identical content includes:
   generating a first hash value from contents of the first non-zero memory page;
   generating a second hash value from the contents of the second non-zero memory page; and
   comparing the first hash value with the second hash value for equality.

4. The method of claim 3, wherein determining that a first non-zero memory page and a second non-zero memory page have identical content further includes comparing the contents of a first non-zero memory page with the contents of a second non-zero memory page if the first hash value is equal to the second hash value.

5. The method of claim 1, wherein all of the non-zero memory pages are scanned for a known pattern.

6. The method of claim 5, wherein contents of all of the non-zero memory pages that do not have a known pattern are hashed and the hashed results are compared with previously hashed results for a match.

7. The method of claim 1, further comprising receiving a request to migrate the virtual machine.

8. The method of claim 1, further comprising:
   determining two or more memory pages have a particular known pattern; and
   mapping the two or more memory pages to a common location in system memory.

9. The method of claim 8, wherein the common location in the system memory contains contents of the page with the particular known pattern.

10. A method of restoring to system memory non-zero pages of a virtual machine that have been saved to persistent storage, the method comprising:
    retrieving metadata of a non-zero page from persistent storage and examining the metadata, the metadata including sufficient data for the contents of the non-zero page to be regenerated solely from the metadata;
    determining that the metadata describes a non-zero page having a known pattern;
    generating a non-zero page having the known pattern solely from the metadata; and
    storing contents of the non-zero page having the known pattern in the system memory; and
    mapping the non-zero page described by the metadata retrieved from the persistent storage to a location in the system memory where the contents of the non-zero page having the known pattern are stored.

11. The method of claim 10, further comprising:
    retrieving metadata of another non-zero page from the persistent storage and examining the metadata;
    determining that the metadata describes a non-zero page having the known pattern; and
    mapping the other non-zero page described by the metadata retrieved from the persistent storage to the location in the system memory where the contents of the non-zero page having the known pattern are stored.

12. The method of claim 10, further comprising:
    retrieving metadata of another non-zero page from the persistent storage and examining the metadata;
    determining that the metadata describes a non-zero page having a second known pattern;
    generating a non-zero page having the second known pattern and storing contents of the non-zero page having the second known pattern in the system memory; and
    mapping the other non-zero page described by the metadata retrieved from the persistent storage to a location in the system memory where the contents of the non-zero page having the second known pattern are stored.

13. The method of claim 10, further comprising:
    retrieving metadata of another non-zero page from the persistent storage and examining the metadata;
    determining that the metadata of the other non-zero page describes a canonical page;
    retrieving the contents of the canonical page from the persistent storage;
    storing the contents of the canonical page in the system memory; and
    mapping the other non-zero page described by the metadata retrieved from the persistent storage to a location in the system memory where the contents of the canonical page are stored.

14. A method of migrating non-zero memory pages of a virtual machine executed in a first computer for execution in a second computer, the method comprising:
    examining metadata of a non-zero memory page of the virtual machine, the metadata including sufficient data for the contents of the non-zero memory page to be regenerated solely from the metadata;
determining that the examined metadata describes a non-zero memory page having a known pattern;
generating a non-zero memory page having the known pattern solely from the metadata and storing contents of the non-zero memory page having the known pattern in a system memory of the second computer; and
mapping the non-zero memory page described by the examined metadata to a location in the system memory of the second computer where the contents of the non-zero memory page having the known pattern are stored.

15. The method of claim 14, further comprising:
examining metadata of another non-zero memory page of the virtual machine;
determining that the examined metadata describes a non-zero memory page having the known pattern; and
mapping the other non-zero page described by the examined metadata to the location in the system memory of the second computer where the contents of the non-zero memory page having the known pattern are stored.

16. The method of claim 14, further comprising:
examining metadata of another non-zero memory page of the virtual machine;
determining that the examined metadata describes a non-zero memory page having a second known pattern;
generating a non-zero memory page having the second known pattern and
storing contents of the non-zero memory page having the second known pattern in the system memory of the second computer; and
mapping the other non-zero memory page described by the examined metadata to a location in the system memory of the second computer where the contents of the non-zero memory page having the second known pattern are stored.

17. The method of claim 14, further comprising:
examining metadata of another non-zero memory page of the virtual machine;
determining that the examined metadata describes a canonical page;
copying the contents of the canonical page from the system memory of the first computer to the system memory of the second computer; and
mapping the other non-zero memory page described by the examined metadata to a location in the system memory of the second computer where the contents of the canonical page are stored.

18. A virtual machine computer system comprising:
a system memory; and
one or more processors programmed to execute a virtual machine process, and to save and restore some of the non-zero memory pages of the virtual machine process using metadata that contains sufficient data for contents of said some of the non-zero memory pages to be regenerated solely from the metadata.

19. The virtual machine computer system of claim 18, wherein the one or more processors are programmed to also save contents of at least one canonical page and restore multiple non-zero memory pages of the virtual machine process to be mapped to the at least one canonical page.

20. The virtual machine computer system of claim 19, further comprising a persistent storage device in which only one copy of the contents of the at least one canonical page is stored.

21. The virtual machine computer system of claim 18, wherein the one or more processors are programmed to examine contents of the non-zero memory pages for a known pattern prior to saving.

22. The virtual machine computer system of claim 18, wherein the one or more processors are programmed to examine contents of the non-zero memory pages for matches prior to saving.

23. The virtual machine computer system of claim 18, wherein the one or more processors are programmed to maintain a table in the system memory that describes contents of memory pages of the virtual machine.

* * * * *